Oct. 24, 1944.   A. L. PARKER   2,360,887
MANUALLY OPERATED TUBE CUTTER
Filed Dec. 21, 1943   2 Sheets-Sheet 2

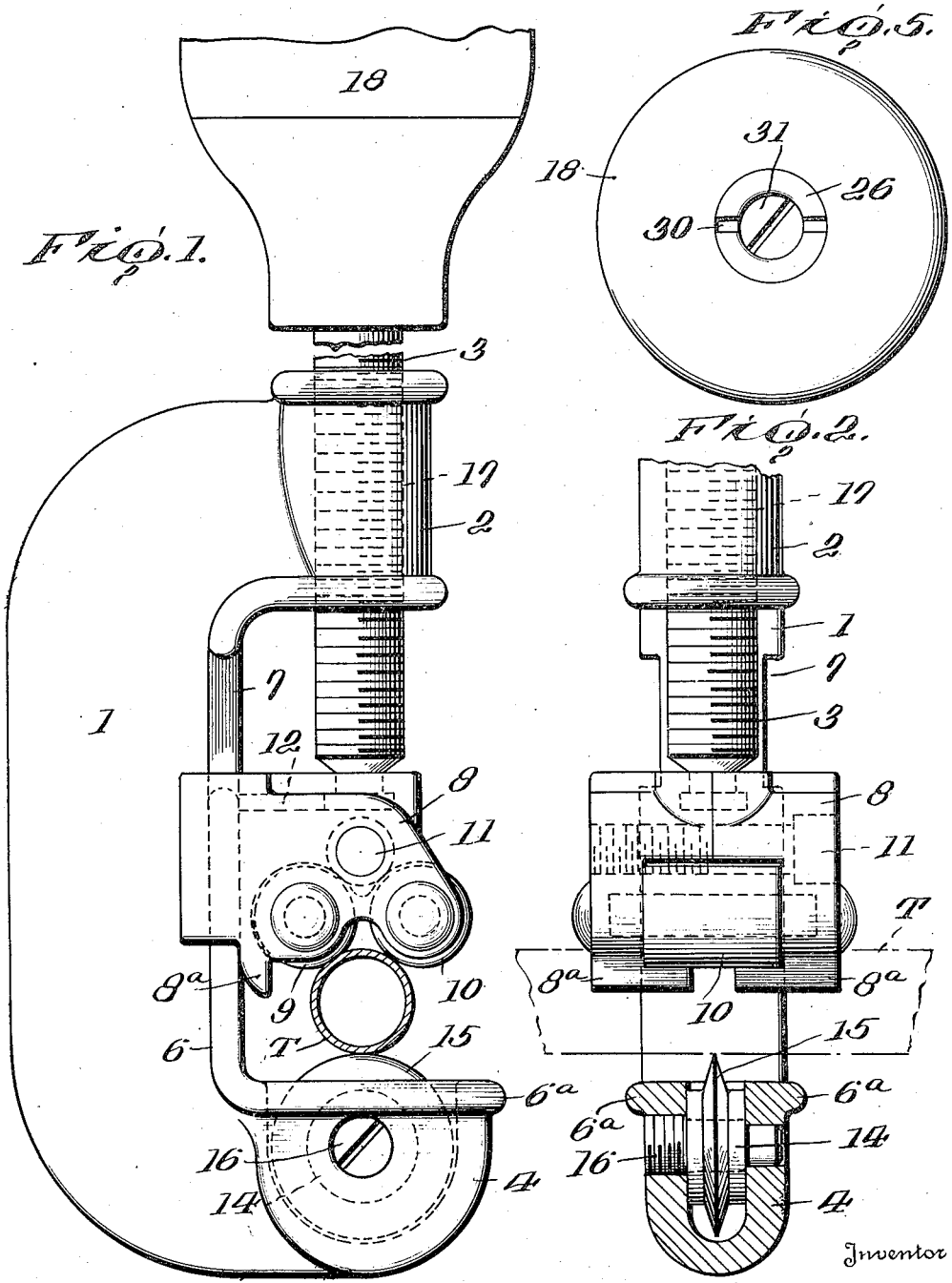

Inventor
Arthur L. Parker
By Mason, Porter and Diller
Attorneys

Patented Oct. 24, 1944

2,360,887

UNITED STATES PATENT OFFICE 2,360,887

MANUALLY OPERATED TUBE CUTTER

Arthur L. Parker, Cleveland, Ohio, assignor to The Parker Appliance Company, Cleveland, Ohio, a corporation of Ohio Application December 21, 1943, Serial No. 515,180

9 Claims. (Cl. 30—102)

The invention relates to new and useful improvemenuts in a manually operated tube cutting tool, and more particularly to a tube-cutting tool of the type wherein the tube is held stationary while the cutting tool is rotated about the tube for cutting the same.

An object of the invention is to provide a simple form of cutting tool wherein the supporting frame is a single integral structure and the feed screw for feeding the tube against the cutter is yieldingly operated so that the manual pressure applied to the turning means for the feed screw will be released when a predetermined turning torque is applied.

A further object of the invention is to provide a cutting tool of the above type wherein there is means for limiting the movement of the carrier toward the cutter by the feed screw so as to prevent the feed rollers from being moved into contact with the cutter.

In the drawings, which show by way of illustration one embodiment of the invention, Figure 1 is a side view of a manually operated tube cutter embodying the improvements.

Figure 2 is a front view of a portion of the cutting tool showing in section the mounting of the tube cutter.

Figure 5 is a plan view of the turning knob.

Figure 3:
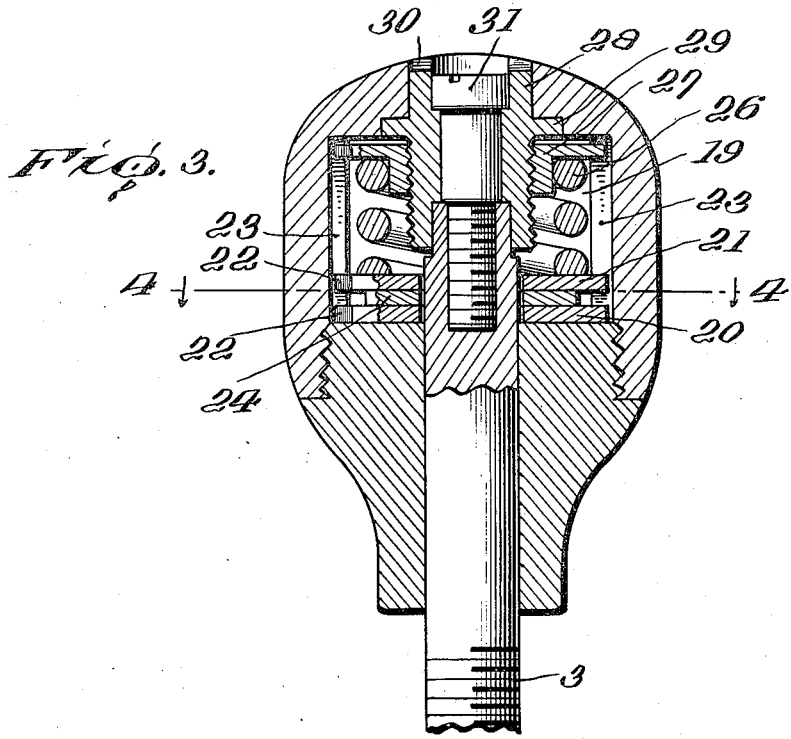
Figure 3 is a sectional view through the knob for turning the feed screw.
Figure 4:
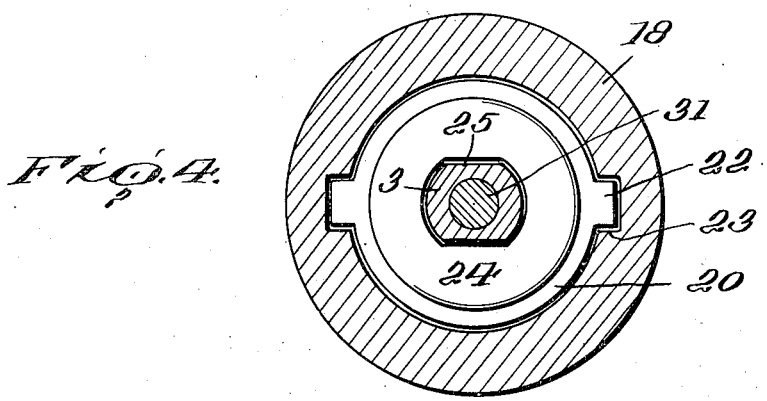
Figure 4 is a section on the line 4—4 of Figure 3.

The cutting tool includes a supporting frame I having an integral projection 2 in which is mounted a feed screw 3. Said frame is also provided with an intgeral projection 4 in which is mounted a cutter 15. The supporting frame is provided with laterally projecting ribs 6 on each side thereof, and the ribs adjacent the integral extension 2 are cut away as indicated at 7. A carrier 8 is mounted for reciprocation on said rib 6. The carrier is provided with feed rollers 9 and 10 and is made in two sections, secured together by a bolt 11. Each feed roller is mounted on a shaft which in turn is mounted in recesses formed in the opposed sections of the carrier. The upper portion of the carrier is provided with an undercut slot 12 which is adapted to receive a head 13 on the end of the feed screw 3. The carrier is provided with lugs which engage in rear of the ribs 6 and when the carrier is raised to the position opposite the cutaway portion 7, then the carrier may be moved laterally and disconnected from the feed screw and the supporting frame of the cutting tool.

The cutting tool includes a body portion 14 carrying a projecting V-shaped peripheral portion 15, which provides a cutting edge for cutting the tube. The body portion is mounted on a supporting shaft 16 which has a threaded connection with the supporting frame extension 4. The rib 6 extends across the upper side of the extension 4 and provides two flat limiting stops 6a. The carrier 8 has depending lugs 8a, 8a, which are adapted to contact with the stops 6a, 6a, respectively, if the carrier is moved by the feed screw to the full extent of its downward movement, as shown in Figure 1. This, of course, could only be attained when there is no tube placed in the cutter. These lugs 8a serve as a means for limiting the movement of the carrier and preventing the feed rollers from contacting with the cutter.

The feed screw 3 is threaded as indicated at 17 and engages a threaded bore in the extension 2, so that when the feed screw is turned in one direction, the carrier will be moved to cause the feed rollers to contact with the tube, and when moved in the other direction, the carrier will be moved away from the tube. As a means for turning the feed screw and releasing the same when a predetermined turning torque has been applied to the feed screw, there is provided a knob 18. This knob is made in two sections having a threaded connection and is shaped so as to provide a chamber 19 within the knob. Said sections are preferably molded of a plastic material. The feed screw extends through the lower section of the knob into this chamber.

Mounted on the upper end of the feed screw are two spaced steel plates 20 and 21. Said plates are provided with projecting lugs 22, 22, which engage freely within grooves 23, 23 formed in the upper knob section. Between these steel plates is a brass plate 24. The feed shaft is shaped so as to provide flat sides 25, 25, and the brass plate 24 has an opening therethrough shaped to conform to the flat-sided section of the feed shaft. This locks the brass plate to the feed shaft so that it turns therewith, while the steel plates are locked to the knob so as to be turned with the knob.

A coil spring 26 bears against the upper side of the plate 21 and also bears against an abutment flange on a collar 27 which is likewise provided with lugs extending into the recesses 23 so that this collar is held from rotation, except as the knob is turned. The collar has a threaded connection with a sleeve 28. Said sleeve 28 has a projecting flange 29 fitting a recess at the upper end of the chamber and the spring pressing against the collar 27 will hold the flange housed in said recess. The upper end of this sleeve is provided with diametrically opposed slots 30, to which a suitable turning tool may be applied for turning the sleeve. When the sleeve is turned the collar will be shifted toward or from the upper end of the knob and thus the tension on the spring may be varied. A bolt 31 is threaded into the upper end of the shaft and serves as a means for securing the shaft to the knob.

The knob is grasped by the hand of the operator for turning the feed shaft.

In the operation of the device, the tube which is to be cut, which is indicated at T in Fig. 1, is placed on the cutter and then the feed screw is operated to bring the feed rollers into contact with the tube. The tube is clamped in a suitable way so as to prevent its rotation and the cutting tool is turned by hand about the tube so as to cause the cutter to progressively cut into the tube until the tube wall is severed. The operator from time to time turns the feed screw during the cutting operation so as to advance the tube on to the cutter. If the operator exerts a pressure beyond a predetermined torque pressure, then the steel plates will slip on the brass plate and will not turn the feed screw.

In other words, these plates between the feed screw and the knob serves as a means for releasing the knob from the feed screw when a predetermined turning torque is applied to the knob, which turning torque, of course, is resisted by the pressure of the tube against the cutter. This avoids overfeeding of the tube against the cutter which might result in the damaging of the cutter.

It is obvious that minor changes in the details of construction and the arrangement of the parts may be made without departing from the spirit of the invention as set forth in the appended claims.

I claim:

1. A tube cutting tool comprising a supporting frame, a rotary cutter mounted on said frame, a tube engaging member mounted on said frame opposed to said cutter and means for moving said cutter and tube engaging member relative to each other including a feed screw mounted in said frame, a manually rotatable knob carried by said screw and yielding means for connecting the knob to the feed screw for turning the same, said connecting means being releasable to permit the knob to turn on the feed screw when a predetermined turning torque is applied to the knob.

2. A tube cutting tool comprising a supporting frame, said frame having a projecting support for a cutting wheel, a cutting wheel rotatively mounted on the projecting portion of said support, a carrier mounted for reciprocation on said frame, feed rollers mounted on the carrier and adapted to engage a tube for feeding the same to the cutting wheel, a feed screw for reciprocating said carrier, a knob, and yieldable means connecting the knob to the feed screw for turning the same, said yieldable means being releasable to permit the knob to turn on the feed screw when a predetermined turning torque is applied to the knob.

3. A tube cutting tool comprising a supporting frame, said frame having a projecting support for a cutting wheel, a cutting wheel rotatively mounted on the projecting portion of said support, a carrier mounted for reciprocation on said frame, feed rollers mounted on the carrier and adapted to engage a tube for feeding the same to the cutting wheel, a feed screw for reciprocating said carrier, a knob, yieldable means connecting the knob to the feed screw for turning the same, said yieldable means being releasable to permit the knob to turn on the feed screw when a predetermined turning torque is applied to the knob, and means whereby the tension of the yieldable means may be adjusted for varying the amount of torque necessary to release the knob.

4. A tube cutting tool comprising a supporting frame having an integral extension adjacent one end thereof, a rotary cutter mounted in said extension, an integral extension adjacent the other end of said frame, a feed screw mounted in said extension, a carrier connected to said feed screw and mounted for movement on said frame between said extensions, a manually rotatable knob carried by said feed screw, and yielding means for connecting the knob to the feed screw for turning the same, said connecting means being releasable to permit the knob to turn on the feed screw when a predetermined turning torque is applied to the knob.

5. A tube cutting tool comprising a supporting frame having an integral extension adjacent one end thereof, a rotary cutter mounted in said extension, an integral extension adjacent the other end of said frame, a feed screw mounted in said extension, a carrier connected to said feed screw and mounted for movement on said frame between said extensions, a manually rotatable knob carried by said feed screw, yielding means for connecting the knob to the feed screw for turning the same, said connecting means being releasable to permit the knob to turn on the feed screw when a predetermined turning torque is applied to the knob, and means whereby said connecting means can be adjusted so as to vary the turning torque at which the knob is released.

6. A tube cutting tool comprising a supporting frame having an integral extension adjacent one end thereof, a rotary cutter mounted in said extension, an integral extension adjacent the other end of said frame, a feed screw mounted in said extension, a carrier connected to said feed screw and mounted for movemet on said frame between said extensions, feed rollers mounted in said carrier, a manually rotatable knob carried by said feed screw, and yielding means for connecting the knob to the feed screw for turning the same, said connecting means being releasable to permit the knob to turn on the feed screw when a predetermined turning torque is applied to the knob, said carrier having projecting lugs adapted to contact with the frame extension carrying the cutter for limiting the movement of the carrier and preventing the rollers from contacting with the cutter when there is no tube placed between the feed rollers and the cutter.

7. A tube cutting tool comprising a supporting frame having a rotary cutter mounted thereon adjacent one end thereof, a feed screw mounted in said frame adjacent the other end thereof, a carrier connected to the feed screw and mounted on the frame for movement toward and from said cutter, a manually rotatable knob carried by the feed screw, said knob being made in two sections providing a chamber within said sections, a friction plate connected to said feed screw and turning therewith, friction plates connected to the knob and turning therewith, and a spring bearing on said friction plates whereby said knob is yieldingly and releasably connected to the feed screw for turning the same.

8. A tube cutting tool comprising a supporting frame having a rotary cutter mounted thereon adjacent one end thereof, a feed screw mounted in said frame adjacent the other end thereof, a carrier connected to the feed screw and mounted on the frame for movement toward and from said cutter, a manually rotatable knob carried by the feed screw, said knob being made in two sections providing a chamber within said sections, a friction plate connected to said feed screw and turning therewith, friction plates connected to the knob and turning therewith, a spring bearing on said friction plates whereby said knob is yieldingly and releasably connected to the feed screw for turning the same, and means for varying the tension of said spring.

9. A tube cutting tool comprising a supporting frame having a rotary cutter mounted thereon adjacent one end thereof, a feed screw mounted in said frame adjacent the other end thereof, a carrier connected to the feed screw and mounted on the frame for movement toward and from said cutter, a manually rotatable knob carried by the feed screw, said knob being made in two sections providing a chamber within said sections, said feed screw being extended into said chamber, spaced friction plates mounted for free movement on said feed screw and connected to said knob so as to turn with the knob, said plates being movable relative to each other, a third friction plate located between said two first-named friction plates and connected to the feed shaft for turning therewith, a threaded collar located at the upper end of said chamber and connected to said knob for turning therewith, a spring between the friction plates and said collar for holding said friction plates in contact, a sleeve extending through said collar and having threaded connection therewith, said sleeve having a flange seated in a recess in said knob, said sleeve being accessible from the exterior of the knob whereby said sleeve may be turned for varying the tension on said spring, a bore extending through said sleeve and threaded into said feed screw for connecting the knob to the feed screw.

ARTHUR L. PARKER.